US011321681B2

(12) United States Patent
Chapman et al.

(10) Patent No.: US 11,321,681 B2
(45) Date of Patent: May 3, 2022

(54) SYSTEMS AND METHODS FOR ISSUING AND TRACKING DIGITAL TOKENS WITHIN DISTRIBUTED NETWORK NODES

(71) Applicant: NORTHERN TRUST CORPORATION, Chicago, IL (US)

(72) Inventors: Justin Chapman, London (GB); Andrew Czupek, Chicago, IL (US); Andrew Monks, Chicago, IL (US); Anthony Stevens, Herefordshire (GB); Arijit Das, Naperville, IL (US); Christopher Price, Plainfield, IL (US); Wayne Hannaway, Westclif-On-Sea (GB); Zabrina Smith, London (GB)

(73) Assignee: Northern Trust Corporation, Chicago, IL (US)

( * ) Notice: Subject to any disclaimer, the term of this patent is extended or adjusted under 35 U.S.C. 154(b) by 0 days.

(21) Appl. No.: 15/845,887

(22) Filed: Dec. 18, 2017

(65) Prior Publication Data
US 2018/0225640 A1    Aug. 9, 2018

Related U.S. Application Data

(60) Provisional application No. 62/455,520, filed on Feb. 6, 2017.

(51) Int. Cl.
*G06Q 20/08* (2012.01)
*G06Q 20/40* (2012.01)
(Continued)

(52) U.S. Cl.
CPC ......... *G06Q 20/0855* (2013.01); *G06F 16/27* (2019.01); *G06Q 20/10* (2013.01);
(Continued)

(58) Field of Classification Search
CPC .............. G06Q 20/0855; G06Q 20/10; G06Q 20/3827; G06Q 2220/00; G06Q 20/401;
(Continued)

(56) References Cited

U.S. PATENT DOCUMENTS 5,892,900 A    4/1999  Ginter et al.
9,818,109 B2   11/2017 Loh
(Continued)

FOREIGN PATENT DOCUMENTS

WO    2016170538 A1    10/2016
WO    2017091530 A1    6/2017
WO    2017161417 A1    9/2017

OTHER PUBLICATIONS

Ron White, How Computers Work, Oct. 15, 2003, Paul Boger, Illustrated by Timothy Edward Downs, 7th Edition (Year: 2003).*
(Continued)

*Primary Examiner* — Mohammad A. Nilforoush
*Assistant Examiner* — Wodajo Getachew
(74) *Attorney, Agent, or Firm* — Dentons US LLP

(57) ABSTRACT

Systems and methods described herein may generate a digital payment token associated with a payor-user indicating the status of a payment obligation of the payor-user. The systems and methods may generate a first block containing the digital payment token and append the first block to a blockchain. The systems and methods may receive a confirmation message from a third-party transaction server that the payor-user has either fully or partially fulfilled his or her payment obligation. Based upon the confirmation message, the systems and methods may retrieve the block containing the digital payment token and update the digital payment token to generate an updated digital payment token. The system and methods may generate a second block containing the updated digital payment token to supersede the first
(Continued)

block and append the second block to the blockchain. The updated digital payment token may indicate that the digital payment token has expired.

16 Claims, 4 Drawing Sheets

(51) Int. Cl.
*G06Q 20/38* (2012.01)
*G06Q 20/10* (2012.01)
*G06F 16/27* (2019.01)

(52) U.S. Cl.
CPC ....... *G06Q 20/3827* (2013.01); *G06Q 20/401* (2013.01); *G06Q 2220/00* (2013.01)

(58) Field of Classification Search
CPC ............... G06F 17/30283; G06F 16/27; G06F 16/30283; G06F 2220/00
USPC .......................................................... 705/76
See application file for complete search history.

(56) References Cited

U.S. PATENT DOCUMENTS

| | | |
|---|---|---|
| 2005/0256802 A1 | 11/2005 | Ammermann et al. |
| 2006/0095376 A1 | 5/2006 | Mitchell et al. |
| 2012/0330846 A1 | 12/2012 | Light et al. |
| 2015/0026072 A1 | 1/2015 | Zhou et al. |
| 2015/0032625 A1 | 1/2015 | Dill et al. |
| 2015/0032626 A1* | 1/2015 | Dill .................... G06Q 20/4016 705/44 |
| 2015/0127547 A1 | 5/2015 | Powell et al. |
| 2015/0206106 A1 | 7/2015 | Yago |
| 2015/0332283 A1 | 11/2015 | Witchey |
| 2015/0363778 A1 | 12/2015 | Ronca et al. |
| 2016/0028552 A1 | 1/2016 | Spanos et al. |
| 2016/0042345 A1 | 2/2016 | Kopczynski et al. |
| 2016/0162873 A1 | 6/2016 | Zhou et al. |
| 2016/0210626 A1 | 7/2016 | Ortiz et al. |
| 2016/0224977 A1 | 8/2016 | Sabba et al. |
| 2016/0259937 A1 | 9/2016 | Ford et al. |
| 2016/0260169 A1 | 9/2016 | Arnold et al. |
| 2016/0267472 A1 | 9/2016 | Lingham et al. |
| 2016/0275461 A1 | 9/2016 | Sprague et al. |
| 2016/0300234 A1 | 10/2016 | Moss-Pultz et al. |
| 2016/0342958 A1 | 11/2016 | Thomas et al. |
| 2016/0342976 A1 | 11/2016 | Davis |
| 2017/0005804 A1* | 1/2017 | Zinder ................ G06F 21/6254 |
| 2017/0011460 A1 | 1/2017 | Molinari et al. |
| 2017/0046526 A1 | 2/2017 | Chan et al. |
| 2017/0098291 A1 | 4/2017 | Code et al. |
| 2017/0103391 A1 | 4/2017 | Wilson, Jr. et al. |
| 2017/0118301 A1 | 4/2017 | Kouru et al. |
| 2017/0132630 A1* | 5/2017 | Castinado ............ G06Q 20/382 |
| 2017/0140408 A1 | 5/2017 | Wuehler |
| 2017/0213289 A1 | 7/2017 | Doney |
| 2017/0232300 A1* | 8/2017 | Tran ....................... H04L 67/10 434/247 |
| 2017/0243177 A1 | 8/2017 | Johnsrud et al. |
| 2017/0243287 A1 | 8/2017 | Johnsrud et al. |
| 2017/0287090 A1 | 10/2017 | Hunn et al. |
| 2017/0323294 A1 | 11/2017 | Rohlfing et al. |
| 2017/0345105 A1 | 11/2017 | Isaacson et al. |
| 2018/0068130 A1 | 3/2018 | Chan et al. |

OTHER PUBLICATIONS

Ron White, How Computers Work, Oct. 15, 2003, Paul Boger, Illustrated by Timothy Edward (Year: 2003).*
Notification of Transmittal of the International Search Report and the Written Opinion of the International Searching Authority, dated Mar. 8, 2018, in corresponding International Application No. PCT/US2017/067177, 10 pages.
Khalil et al., "Revive: Rebalancing Off-Blockchain Payment Networks", CCS'17, Oct. 30-Nov. 3, 2017; retrieved from https://acmccs.github.io/papers/p439-khalilA.pdf; pp. 439-453.
Lewis. A., "A Gentle Introduction to Smart Contracts", Bits on Blocks, posted Feb. 1, 2016, retrieved from the Internet: https://bitsonblocks.net/2016/02/01/a-gentle-introduction-to-smart-contracts/, 16 pages.
Supplementary European Search Report, dated Nov. 20, 2019, issued in corresponding European Application No. 17895275, 10 pages.
Europe Office Action dated Apr. 19, 2021 in related Application 17895275.0 filed Dec. 19, 2017 (8 pages).
Europe Supplementary Search Report dated Nov. 20, 2019 issued in corresponding European Application No. 17895164 filed Dec. 19, 2017 (9 pages).
Crosby et al., BlockChain Technology Beyond Bitcoin, Oct. 16, 2015, XP055363520, Retrieved from the Internet: URL:http://scet.berkeley.edu/wp-contenl/uploads/BlockchainPaper.pdf [retrieved on Apr. 10, 2017) (35 pages).
International Search Report and the Written Opinion dated Mar. 8, 2019 in corresponding International Application No. PCT/US2017/067173 filed Dec. 19, 2017 (13 pages).
Massacci et al., Decentralized Transaction Clearing Beyond Blockchains, retrieved from the Internet: https://papers.ssrn.com/sol3/papers.cfm?abstract_id=2794913 (via 'Download this Paper' link), posted: Jun. 21, 2016 (4 pages).
Proverbio et al., "Distributed Consensus Ledgers", Accenture, 2015, retrieved on Dec. 28, 2016 from https://www.accenture.com/t20151002T010405_w_/us-en/_aenmedia/AccentureConversion-Assets/DotCom/Documents/Global/PDF/Dualpub_22/Accenture-Banking-Distributed-consensus-ledgers-payment.pdf (20 pages).

* cited by examiner

Payment Sequence 300

Payee-user or permissioned third party initiates a payment transaction associated with a contractual payment obligation that may be captured within a smart contract
301

Application server instructs server of payment network to initiate payment from payor to payee
303

Upon successful payment submission, web application calls blockchain services to record additional linked transactions
305

Response from payment services received when payment is settled
307

Web application makes call to blockchain services application to update capital amount paid and record additional linked transactions
309

*FIG. 3*

SYSTEMS AND METHODS FOR ISSUING AND TRACKING DIGITAL TOKENS WITHIN DISTRIBUTED NETWORK NODES

CROSS-REFERENCE TO RELATED APPLICATIONS

This application claims priority to U.S. Provisional Patent Application Ser. No. 62/455,520, filed on Feb. 6, 2017, which is hereby incorporated by reference in its entirety.

TECHNICAL FIELD

This application relates generally to systems and methods for tracking of payment obligations on a distributed database such as a blockchain, and more specifically generating digital payment tokens associated with payment obligations and updating the digital payment tokens upon the fulfillment of the payment obligations.

BACKGROUND

Distributed databases such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a second block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database have to recreate and redistribute the blockchain faster than the honest network nodes, which, in most cases, is computationally infeasible. In other words, data integrity is guaranteed by the virtue of multiple network nodes in a network having a copy of the same blockchain. A central trust authority is therefore not required to vouch for the integrity of the distributed database hosted by multiple nodes in the network.

However, there are several technical shortcomings in the current blockchain technology. One problem is how to provide a system and a method to securely generate, track, and update the statuses of payment obligations between multiple transaction parties. Another problem is how to provide a system and a method for a blockchain to automatically and securely update the statuses of payment obligations based upon payment confirmations received from third party servers. Another problem is how to provide a system and a method that securely generates, tracks, and updates the statuses of payment obligations based upon one or more smart contract auto-calculations within the blockchain . . . .

SUMMARY

What is therefore desired is a system and a method for a blockchain to generate, track, and update statuses of payment obligations within the blockchain between multiple transacting parties. What is also desired is a system and method for a blockchain to automatically update payment obligations within the blockchain based upon payment confirmation received from third party servers. What is further desired is a system and a method that generates, tracks, and updates the statuses of payment obligations based upon one or more smart contract auto-calculations within the blockchain.

The systems and methods disclosed herein are intended to address the shortcomings in the art mentioned above, but may also provide additional or alternative benefits as well. As described herein, the systems and methods disclosed herein may provide a back-end functionality to securely track and update the statuses of payment obligations between parties based on transaction and payment records between multiple parties stored in the blockchain. Furthermore, where smart contracts and other information governing the transaction activities are stored in a blockchain, the systems and methods disclosed herein may beneficially leverage the power of the blockchain to securely track and update the statuses of the payment obligations within the blockchain itself based on the transaction activities within the blockchain. The systems and methods disclosed herein may provide for a blockchain to automatically and intelligently securely update the statuses of payment obligations based upon payment confirmations received from third party servers. More specifically, the systems and methods may generate a digital payment token associated with a payor-user indicating the status of a payment obligation of the payor-user. The systems may generate the digital payment token based on one or more outputs generated by a smart contract auto-calculation. The systems and methods may generate a first block containing the digital payment token and append the first block to a blockchain. The systems and method may transmit a notification message a client device of the payor-user or a permissioned third party user. In response to receiving an authorization from the payor-user, the systems and methods may transmit one or more transaction requests to a third-party transaction server. Furthermore, the systems and methods may receive a confirmation message from the third-party transaction server that the payor-user has either fully or partially fulfilled his or her payment obligation. Alternatively or additionally, the systems and methods may receive the confirmation message based on another smart contract auto-calculation. As another alternative, the systems and methods may receive the confirmation from a blockchain enabled banking server implementing a separate payment system in addition to the blockchain hosted by distributed network nodes. Based upon the confirmation message, the systems and methods may retrieve the block containing the digital payment token and update the digital payment token to generate an updated digital payment token. The system and methods may generate a second block containing the updated digital payment token to supersede the first block and append the second block to the blockchain. The updated digital payment token may trigger yet another smart contract auto-calculation.

In one embodiment, a computer-implemented method of generating and updating digital payment tokens in a blockchain comprises: receiving, by a network node and via a webserver, a payment request containing payment data for a payment transaction, from a client device associated with a payee-user or a permissioned third-party user; generating, by the network node, a first digital payment token comprising one or more data fields of the payment data and a payment status field indicating the payment transaction is incomplete; transmitting, by the network node, a first message to a client device associated with a payor-user, the first message comprising one or more data fields of the payment data received from the client device associated with the payee-user or the permissioned third-party user; generating, by the network node, a first token block containing the first digital payment token on a system blockchain, wherein the network node generates an address for the token block based upon a cryptographic hash of one or more data records of one or more blocks of the system blockchain; transmitting, by the network node, to a third-party server of a payment service system one or more transaction requests requesting the third-party server to transfer funds from a payor account to a payee account; upon the network node receiving from the third-party server a status message indicating the payment transaction is complete: generating, by the network node, a second digital payment token comprising one or more data fields of the payment data and the payment status field indicating the payment transaction is complete; generating, by the network node, a second token block containing the second digital payment token on the system blockchain, wherein the network node generates an address for the second token block based upon a cryptographic hash of one or more data records of one or more blocks of the system blockchain; and transmitting, by the network node, a second message to the client device associated with the payor-user, the second message comprising one or more data fields of the status message received from the third-party server of the payment service system.

In another embodiment, a system for generating and updating digital payment tokens in a blockchain comprises: a plurality of network nodes, each including a non-transitory storage medium storing a respective local copy of a blockchain; at least one of the plurality of network nodes having a processor configured to: receive a payment request, via a webserver, containing payment data for a payment transaction, from a client device associated with a payee-user or a permissioned third-party user; generate a first digital payment token comprising one or more data fields of the payment data and a payment status field indicating the payment transaction is incomplete; transmit a first message to a client device associated with a payor-user, the first message comprising one or more data fields of the payment data received from the client device associated with the payee-user or the permissioned third-party user; generate a first token block containing the first digital payment token on a system blockchain, wherein the processor generates an address for the token block based upon a cryptographic hash of one or more data records of one or more blocks of the system blockchain; transmit to a third-party server of a payment service system one or more transaction requests requesting the third-party server to transfer funds from a payor account to a payee account; upon the processor receiving from the third-party server a status message indicating the payment transaction is complete: generate a second digital payment token comprising one or more data fields of the payment data and the payment status field indicating the payment transaction is complete; generate a second token block containing the second digital payment token on the system blockchain, wherein the network node generates an address for the second token block based upon a cryptographic hash of one or more data records of one or more blocks of the system blockchain; and transmit a second message to the client device associated with the payor-user, the second message comprising one or more data fields of the status message received from the third-party server of the payment service system.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 3 shows an execution of an exemplary method 300 for generating and monitoring a digital payment token in response to a user-initiated transaction, according to an exemplary embodiment.

DETAILED DESCRIPTION

Figure 1:
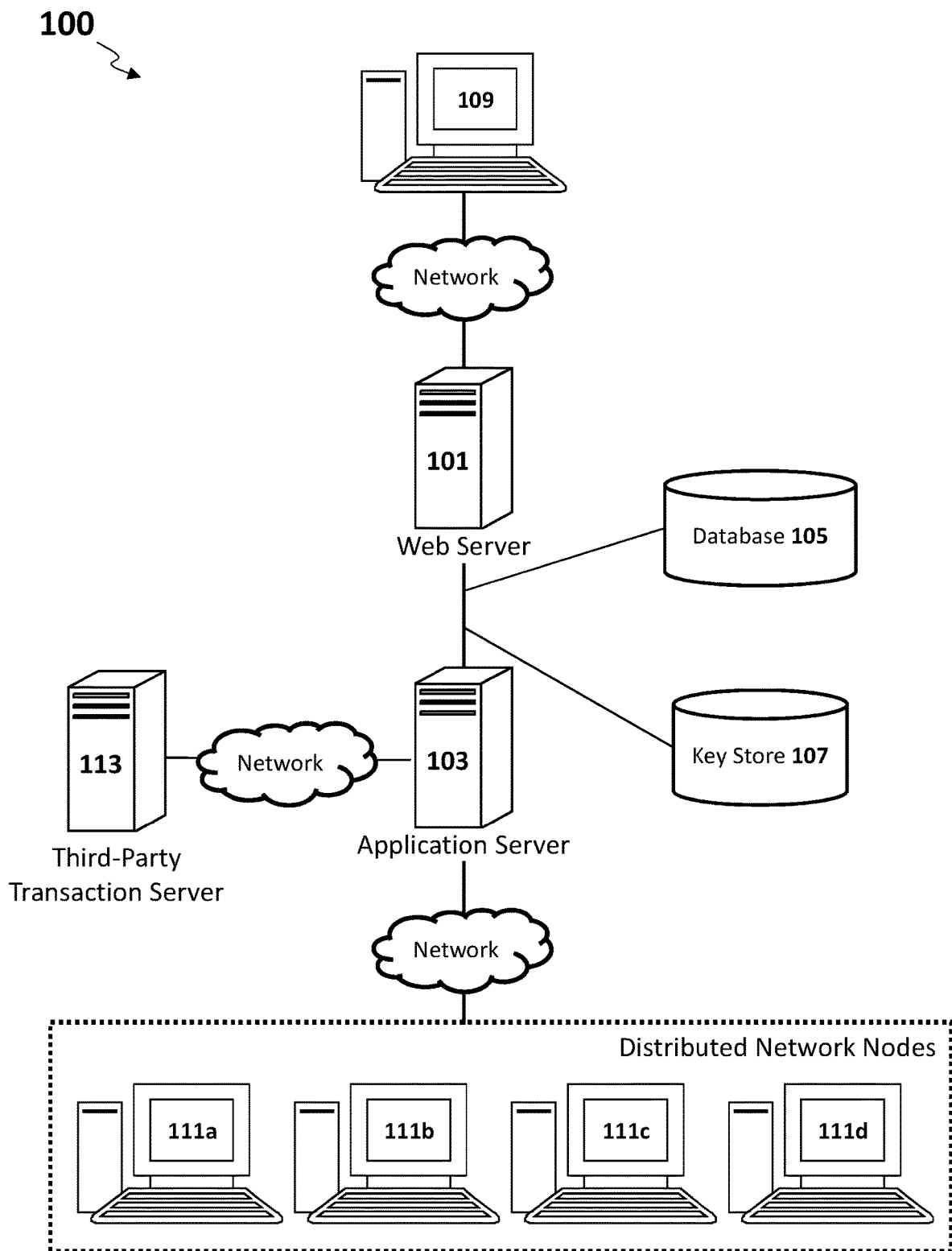
FIG. 1 shows components of a distributed data control system 100, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods that may generate digital payment tokens within a distributed network nodes framework. For example, in a distributed ledger such as a blockchain environment, a network node (or an associated computing system) may generate a digital payment token. In some implementations, the network node may generate the digital payment token in real time in response to the network node or other network nodes executing a smart contract or a portion thereof such as a digitized payment clause. In other words, the network node may perform an intelligent auto-calculation based upon a trigger condition and generate the digital payment token as an output to or based on an output of the intelligent auto-calculation. In other implementations, the network node may generate the digital payment token based upon a manually entered request on an interface rendered by the network node or other network nodes. The digital payment token may be a data record containing one or more data fields with pieces of information associated with a payment obligation or transaction. For example, the digital payment token may comprise data fields such as amount, currency, identifying information of a payee, identification information of a payor, and expected payment date. One having ordinary skill in the art understands that these data fields may be empty, that is, contain a null value that can later be updated. Furthermore, in some embodiments, the network node may encrypt one or more data fields within the digital payment token using one or more encryption keys. For example, the network node may have to ensure data privacy and keep the information within the digital payment token, such as identifying information of the payee and identification information of the payor, private and confidential. In some embodiments, the network node may use separate encryption keys for each different subsets of data fields, and in other implementations, the network node may use a single key for all the data fields.

The network node may generate a block (also referred to as token block in this disclosure) containing the digital payment token. In other words, the network node may create an immutable record of the digital payment token within the blockchain. To do so, the network node may use a consensus threshold to verify the latest valid blockchain within the distributed network nodes and append the block to the latest valid blockchain. The network node may generate the address for the appended block based upon a cryptographic hash of one or more data records within data blocks of the latest valid blockchain, and in some cases, the data records within the appended block. One having ordinary skill in the art understands that the appended block (or token block) may contain other data records in addition to the digital token. In some embodiments, the network node may encrypt the token block or portions thereof using one or more encryption keys.

A network node of the network nodes may update the digital payment token based upon receiving a full or partial payment confirmation message from third party payment server or a payment system implemented by the distributed network nodes. In some embodiments, the payment system implemented by the distributed network nodes may be separate from the implementation of the blockchain. The network node may then generate a new block (or token block) containing the updated digital token block, wherein the updated digital payment token supersedes the previous token block. Therefore, the distributed network nodes may maintain immutable and digitized records of movement of funds within the different blocks of the blockchain. In other words, the distributed network nodes may provide an immutable and digitized record of the entire payment obligation cycle. The network nodes may provide users with access to the record based on a smart contract implementing permissions control.

Based on the generation of and updates to digital payment tokens and generation of blocks containing the digital tokens or updated digital tokens, the network nodes may trigger other linked events or linked transactions. For example, an update to a digital token may be a digital event trigger for an intelligent auto-calculation, which in turn may trigger other blockchain based or API based events such as downstream transactions and notification messages of the one or more events to various system users of the distributed network nodes.

FIG. 1 shows components of a distributed data control system 100, according to an exemplary embodiment. The exemplary system 100 may comprise a webserver 101, an application server 103, databases 105, a key store 107, a client device 109, distributed network nodes 111, and a third-party transaction server 113. Aspects of the system 100 may be configured to employ and manage a system blockchain, sometimes referred to in the art as a "distributed ledger," and may include blockchain-based distributed ledger software (e.g., Hyperledger, Ethereum, Openchain, TerraLedger). In some embodiments, the system blockchain may be a private party blockchain. The system blockchain may operate as a distributed database that stores data records associated with users and transaction documents, where the data records stored on the system blockchain may be blocks of data that are hosted on distributed network nodes 111. It should be appreciated that the data stored in records within system databases 101 may vary from the data stored in blocks of the system blockchain hosted on network nodes 111.

A webserver 101 may host a website accessible to end-users, where the content presented via the various webpages may be controlled based upon each particular user's role and/or permissions. The webserver 101 may be any computing device comprising a processor and non-transitory machine-readable storage capable of executing the various tasks and processes described herein. Non-limiting examples of such computing devices may include workstation computers, laptop computers, server computers, and the like. While the exemplary system 100 includes a single webserver 101, one having skill in the art would appreciate that some embodiments the webserver 101 may include any number of computing devices operating in a distributed computing environment.

The webserver 101 may execute software applications configured to host a website (e.g., Apache®, Microsoft IIS®), which may generate and serve various webpages to client devices 109. The website may be used to generate and access data stored on a system database 105 or in a blockchain hosted by nodes 111 of the system 100. In some implementations, the webserver 101 may be configured to require user authentication based upon a set of user authorization credentials (e.g., username, password, biometrics, cryptographic certificate). In such implementations, the webserver 101 may access a system database 105 configured to store user credentials, which the webserver 101 may be configured to reference in order to determine whether a set of entered credentials (purportedly authenticating the user) match an appropriate set of credentials that identify and authenticate the user. Similarly, in some implementations, the webserver 101 may generate and serve webpages to a client device 109 based upon a user role within the system 100 (e.g., administrator, investor, investment promoter). In such implementations, the user role may be defined by data fields in user records stored in the system database 105, and authentication of the user and user role may be conducted by the webserver 101 by executing a access directory protocol (e.g. LDAP). The webserver 101 may then be instructed to generate webpage content, access or generate data stored in the system database 105, and access or generate data stored in the blockchain instances, according to the user role defined by the user record in the system database 105.

An application server 103 may generate, access, and update blockchain instances hosted on system nodes 111, according to instructions received from a client device 109 via a webserver 101. The application server 103 may be any computing device comprising a processor and non-transitory machine-readable storage capable of executing the various tasks and processes described herein. Non-limiting examples of such computing devices may include workstation computers, laptop computers, server computers, and the like. While the exemplary system 100 includes a single application server 103, one having skill in the art would appreciate that in some embodiments the application server 103 may include any number of computing devices operating in a distributed computing environment. It would also be appreciated that although the application server 103 is shown in FIG. 1 as being a separate device from a webserver 101, in some embodiments the webserver 101 and the application server 103 may be the same device.

Software executed by the application server 103 may provide blockchain services to users interacting with the application server 103 via the webserver 101. The application server 103 may update and query record in the system database 105 according to the instructions received from the client device 109. The application server 103 may then generate blocks for the system blockchain, where the blocks contain data from the records of the system database 105. The application server may then update a local instance of the system blockchain, and subsequently instruct network nodes 111 to update the instances of the system blockchain stored locally on each of the network nodes 111. Each new block may be generated with a timestamp or other data that links the new block with existing blocks on the blockchain. As an example, when the application server 103 generates a new digital identity record, the application server 103 may then generate a new block containing the digital identity record and an address for the new block based upon a one directional cryptographic hash of one or more data fields of the digital identity record. The application server 103 may then append the new block in the system blockchain within the local instance of the blockchain stored in the application server 103. The application server 103 then transmits the new block to each respective network node 111. The network nodes 111, in turn, may update the local instances of the blockchain stored on each of the network nodes 111. In other implementations, the application server 103 may transmit the blockchain or portions thereof to the network node 111, and the network nodes may accordingly replace the local instances of the system blockchain or portions thereof using the transmission received from the application server 103.

In operation, when a user instructs the application server 103 to conduct a transaction requiring a query of the blocks of the blockchain, the application server 103 may conduct a poll of the network nodes 111 to identify the queried data, based on the hash values identifying the blocks, and then determine whether the data within the identified blocks is accurate. The application server 103 may then await a response from a predetermined quorum of network nodes 111 to confirm the data in the blocks; the application server 103 may then proceed with a processing transaction using the data blocks of the blockchain, provided that a predetermined threshold number of network nodes 111 indicate that the blocks at issue match the blocks of the instance stored locally on each of the network nodes 111.

The application server 103 may generate block addresses for data to be retrieved from blockchain instances of the system blockchain. Machine-readable computer files containing various forms of documents (e.g., PDF, DOC, XLS) may be uploaded to the application server 103 via a webserver 101, or otherwise stored into a system database 105, after which the application server 103 may generate a hash value of the document, where the application uses the hash value or other identifier value to reference the file from a system database 105. The application server 103 may then generate the block address for the file by generating a hash of the document and a hash value of the immediately preceding block data or block address. This block address may then be stored into the system database 105 in a document record along with the file and any number of additional data field entries related to the computer file. In operation, the application server 103 or network nodes 111 may reference the block of the blockchain containing the file according to the block address. The application server 103 may generate additional blocks and corresponding block addresses on the system blockchain in a similar manner— e.g., generating a hash value for a block containing user data and then generating a new block address using the block address of the preceding block. One having skill in the art will appreciate that block addresses may be generated in any number of combinations of hashed block data and/or hashed block addresses from the new block and one or more preceding blocks, such that the address of the new block is dependent upon, or otherwise linked to, at least the immediately preceding block.

In some implementations, a system blockchain may contain smart contracts, which are executable coded scripts that instruct the application server 103 and/or network nodes 111 to perform predetermined processes when certain conditions, as indicated by the smart contract, are satisfied. In some instances, these processes instruct the application server 103 and/or network nodes 111 to generate a new block on the blockchain, often superseding the information found in existing blocks in the system blockchain.

For example, in some implementations, a smart contract may be employed by the system 100 to control user access to machine-readable computer files stored on the system blockchain and/or in a system database 105. The smart contract may comprise code functioning logically as a matrix table for user permissions that associates users or user roles with documents contained within the computer files stored in the system database 105. In such implementations, the smart contract may comprise machine-readable software code that includes instructions for the application server 103 and network nodes 111, and, in some cases, block addresses for blocks on the system blockchain for blocks containing a digital identity record, user role rules in the system database 105 or application server, and/or document records in the system database 105, among other types of data. When the application server 103 receives a document request or a payment request from a user device 109, to determine whether the user may access the requested document, the application server 103 may reference a block address containing the digital identity record associated with the user that may contain the permission rules or user role, and/or a block address for the smart contract containing the permissions rules. The application server 103 is instructed by the smart contract whether to retrieve the document from the system database 105 according to the user role, or other user identifier mapping the user or user role to the requested document. The application server 103 may retrieve the document file from the system database 105 upon determining from the smart contract permission data that the user or user role is associated with the document requested. Furthermore, the system 100 may execute the permissions control smart contract for generating the digital payment tokens, transmitting notifications, and allowing access to various parts of immutable records stored in the system blockchain.

In some implementations, the system database 105 may include a payment entity relationship table. The payment entity relationship table may contain one or more encrypted data records containing data fields containing information on external payment entities of system users. As an example, the payment entity may be a bank that maintains a bank account of a system user within a payment system and an associated payment server. In some implementations, the system 100 may maintain a payment system (not shown) separate from the network nodes 111. In some implementations, the system database 105 may not include the payment entity relationship table. In these implementations, a component of the system 100 may access an external payment entity relationship table using API calls.

In other implementations, the system 100 may implement the payment entity relationship table as a part of a smart contract in the system blockchain. For example, a portion of the smart contract may contain a tabular representation of an association between a system user and a bank. The system 100 may control access and view of the payment entity relationship table based upon permissions control, which also may be implemented as a smart contract on the system blockchain.

As mentioned, some embodiments may comprise a system database 105 hosted on one or more computing devices, where the system database 105 may store data records associated with various aspects of the application services offered to end users. Non-limiting examples of what may be stored in the system database 105 may include: user records that may comprise data fields describing users (e.g., user data), such as user credentials (e.g., username, passwords, biometrics, encryption certificates), block addresses for blocks on the system blockchain, user account data, user roles or user permissions; document records that may comprise machine-readable computer files (e.g., word processing files), parsed portions of such computer files, or metadata associated with computer files; and application data that may include software instructions executed by an application server 103 or data used by the such applications executed by the application server 103. The system database 105 may be hosted on any number computing devices comprising a non-transitory machine-readable storage medium and capable of performing the various tasks described herein. As shown in FIG. 1, the system database 105 may be accessed by a webserver 101 and/or an application server 103 via one or more networks. But one having skill in the art would appreciate that the system database 105 may be hosted on the same physical computing device functioning as a webserver 101 and/or functioning as an application server 103.

In some embodiments, the system 100 may store a digital identity record for a user or an entity within the system blockchain. To do so, the system 100 may allow an admin user to generate digital identity templates of different types based on the entity. The template may include mandatory data fields and supplemental data fields. The system 100 may store the templates within the system blockchain and/or in the databases 105. When the system 100 receives a request to generate a digital identity record for an entity, the system 100 may retrieve a digital identity template, either from the system blockchain or from the databases 105, based on the type of the entity. The system 100 may generate a digital identity record based upon the respective digital identity template. The system 100, through one or more network nodes 111, may prompt the entity to enter the information required for data fields in the generated digital identity record. Furthermore, one or more of the data fields of the digital identity record may have an independent status, and the system 100 or a trusted third party server may update the status of the digital identity record. The digital identity record may include one or more one directional hashes of one or more verifying documents, such as a scanned copy of passport verifying name and date of birth. Furthermore, the digital identity record may include one or more directional cryptographic hashes of biometric information of the user such as fingerprint data, retina scan data, and/or any other type of biometric information.

In some embodiments, document records stored on the system database 105 may comprise a data field containing document-identifying hash values generated by an application server 103 according to a hashing algorithm implemented by a system blockchain, when a new document record containing a machine-readable computer file (e.g., PDF, DOC, XSL), such as transaction documents, is generated or updated. The hash value may be generated using one or more data fields that describe the computer file, which may be uploaded by a user via a website portal or pulled from the document record within the system database 105. The hash value may be a unique identifier for the particular document record, and may be used by various computing devices of the system 100, such as the system database 105, to reference the computer file or metadata describing the computer file, which may be stored in the system database 105 and/or on blocks of the system blockchain that is hosted on network nodes 111.

A key storage database 107, sometimes referred in the art as a "high security module," "key appliance," "certificate authority," or the like, may be a computing device configured to manage and distribute encryption keys and cryptographic certificates to various computing devices in the system 100 according to predetermined roles and rules. In some implementations, encryption keys may be used for authentication of users when users log into a website hosted on a webserver 101. In some implementations, encryption keys may be used to encrypt the data blocks of the system blockchain. Additionally or alternatively, encryption keys may be used to confirm, or "sign," data transfers to confirm to a data transfer recipient that the data originated from a known party. Encryption keys may be also be used by users at an application level to apply a digital signature to a document or contract, which, in some cases, may trigger instructions from script code of a smart contract stored on the system blockchain.

The key storage database 107 may be hosted on any number computing devices comprising a non-transitory machine-readable storage medium and capable of performing the various tasks described herein. As shown in FIG. 1, the key storage database 107 may be accessed by a webserver 101 and/or an application server 103 via one or more networks, but the key storage database 105 may also be accessed by a user device 109 and network nodes 111 to retrieve or confirm encryption keys or encryption key signatures. Moreover, one having skill in the art would appreciate that the key storage database 107 may be hosted on the same physical computing device functioning as a webserver 101 and/or an application server 103.

Network nodes 111 may host one or more blocks of the system blockchain. A network node 111 may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 111 are described as storing blocks of the blockchain in FIG. 1, other computing devices, such as an application server 103, may host blocks of the blockchain. Each network node 111 locally stores an instance of the system blockchain in the storage medium of the system blockchain, and further executes a software application that instructs the network node 111 on generating and querying blocks within the locally stored blockchain instance.

In operation, a network node may generate new blocks on a locally stored instance of the system blockchain according to data received from an application server 103 or other network nodes 111. In some instances, the application server 103 may update a local instance of the blockchain stored on the application server 103, and then instructs one or more of the network nodes 111 to update each blockchain instance stored on such network nodes 111. Moreover, the application server 103 may query the blocks of the system blockchain according to a block address stored in the system database 105. When the application server 103 executes the query of the blocks on the system blockchain, the application server 103 may poll the network nodes 111 to determine the most recent data on the system blockchain. The application server 103 may be confident that the data at block is the desired data according to a voting mechanism encoded within the blockchain software executed by the network nodes 111. Each network node 111 may receive the query for the block and block address, and return a response to the application server 103 indicating whether the block address contains the desired data. In this way, the application server 103 may be certain that data in the blockchain is resistant to corruption, as each blockchain instance on each network node 111 would need to be corrupted in the same way so that each block address is corrupted in the same way. Furthermore, the system blockchain may also disallow the application server 103 from acting on obsolete data. For instance, a network node 111a may execute a smart contract that instructs the network node 111a to generate a second block that updates data records in a first block on the local blockchain instance. In other words, the data records in the first block may be obsolete being superseded by the data records in the second block. After the update, the network node 111a may then accordingly instruct one or more remaining network nodes 111b, 111c and the application server 103 to update the respective local blockchain instances on those nodes 111b, 111c and application server 103. However, the application server 103 may not have updated its local blockchain instance before the application server 103 receives a data query or instruction for the updated data records from the user device 109 or smart contract. Prior to responding to the query, the application server 103 may use the voting mechanism to ascertain the latest valid blockchain. As the latest valid blockchain may contain the updated data record, such voting mechanism may protect against the application server 103 from acting on obsolete data and may keep the system blockchain resistant to data collisions.

A client device 109 may be any computing device allowing a user to interact with application server 103 via a webserver 101. The client device 109 may execute an Internet browser or local application that access the webserver 101 in order to issue requests or instructions to the application server 103 to access the system blockchain. The client device 109 may transmit credentials from user inputs to the webserver 101, from which the webserver 101 may authenticate the user and, in some implementations, determine a user role. One having skill in the art would appreciate that the client device 109 may comprise any number of input devices configured to receive any number of data inputs, including various types of data inputs allowing for authentication (e.g., username, passwords, certificates, biometrics). One having skill in the art would also appreciate that the client device 109 may be any computing device comprising a processor and non-transitory machine-readable storage medium allowing the client device 109 to perform the various tasks and processes described herein.

As an example of the client device 109 operation, the client device may execute an Internet browser that accesses a webserver 101 hosting fund investment administration website that allows access for fund managers, administrators and investors and other third parties to a common platform for the end-to-end administration of fund investments, using the device a fund manager may initiate fund lifecycle events such as a payment request associated with a capital call from investors, and investors may use the platform to view lifecycle events such as the capital call and associated payment obligations due in relation to their investments. As the transaction proceeds, the client devices 109 of the investor-user or a promoter-user may be used to upload machine-readable computer files (e.g., PDF, DOC, XSL) containing transaction information. The computer files may be stored into document records in a document database 105, which may then be added to blocks of the system blockchain, where the blocks are accessible according to block addresses that are then stored into the document record for the particular computer file. The client device 109 may issue queries or instructions to the application server 103 via the webpages generated by the webserver 101, which then instruct the application server 103 to query the blocks on the network nodes 111, and, in some instances, perform various tasks, such as retrieving or updating a file from the system database 105.

The system 100 may comprise one or more third-party transaction servers 113 operated by payment services systems, such as the Society for Worldwide Interbank Financial Telecommunication (SWIFT), Fedwire, and the Automated Clearing House (ACH), among others. Although a single transaction server 113 is shown in FIG. 1, one having skill in the art would appreciate that embodiments may comprise any number of transaction servers 113 operated by any number of payment services. The transaction server 113 may publish payment status records to computing devices configured to receive or otherwise monitor these status records, such as an application server 103, network nodes 111, or other computing device of the system 100. These status records may be transmitted to subscribing computing devices over one or more networks, such as Internet Protocol (IP) based networks and/or telecommunications networks, and formatted with particular data structures according to the particular standards used by the payment service system hosting the transaction server 113.

In some embodiments, an application server 103 may monitor or otherwise subscribe to payment records generated and published by the transaction server 113. The application server 103 may then generate digital payment tokens representing the payment status of a particular party-obligation, where the digital payment token may comprise one or more data fields containing payment status data associated with a given transaction. The application server 103 may generate a digital token block on the system blockchain for the digital payment token Furthermore, the application server 103 may generate a block address for the digital payment token block by generating a hash value from the one or more data fields of the digital payment token and the data field or block address of one or more preceding blocks. The block address for the digital payment token may be stored into a system database 105 and/or the code of a smart contract referenced by the application server 103 to identify the block address for a particular digital payment token block. In some implementations, the application server 103 may generate the data fields for a digital payment token (e.g., payor, payee, amount, date due, payment type) in response to data inputs received from a client device 109, via webpages presented by the webserver 101. And in some implementations, the application server 103 may receive the data fields for a digital payment token from a smart contract, whereby code of a smart contract may be generated by user and then added to a block of the blockchain, which, when executed, instructs the application server 103 to generate a digital payment token using payment data provided from the smart contract.

The third-party server 113 may communicate transaction data with the application server 103 over one or more networks, using any number compatible data formats and protocols. The transaction data may indicate the status of payments transactions; the application server 103 may use the status data to update transaction records stored in a system database 105 and generate digital payment tokens to be stored into token blocks of the system blockchain. In some cases, the transaction data that the application server 103 receives from the third-party server 113 may trigger execution of one or more smart contract code-portions that instruct the application server 103 to execute one or more processes, such as generating and transmitting notifications to transaction parties, updating records in the system database 105, and generating new blocks on the system blockchain, among other processes. The application server 103 may further transmit to the third-party server 113 transaction instructions containing portions of the payment transaction data. In some instances, the transaction instructions may instruct the third-party server 113 to execute a funds-transfer from a payor account to a payee account.

In some implementations, the system 100 may generate digital payment tokens based upon one or more intelligent auto-calculations. For example one or more distributed network nodes 111 may execute a smart contract block that generate digital payment tokens to be transmitted to parties with payment obligations. The one or more distributed network nodes 111 may execute the smart contract block upon the system 100 (or at least one of the one or more distributed network nodes 111) receiving a digital event trigger. The digital event trigger may be, for example, a generation of a previous digital payment token, an update to the previous digital payment token, and/or the expiry of the previous digital payment token. As other examples, the digital event trigger may be a predetermined date, a predetermined time, a predetermined duration of time, and/or one or more system user actions. The system 100 (or at least one of the one or more network nodes 111) may execute a smart contract for an intelligent auto-calculation and generate the digital payment tokens in response to the execution. In some implementations, one or more digital payment tokens and actions related to the one or more digital payment tokens may perform as digital event triggers. That is, a digital payment token, which may have been generated based on first set of intelligent auto-calculations may trigger a second set of intelligent auto-calculations downstream.

As an example, an intelligent auto-calculation within the system 100 in a capital call context may generate one or more digital payment tokens associated with the cash obligations to multiple parties. In response to the generation of the digital payment tokens, the one or more network nodes 111 may transmit notifications to one or more computer systems. Furthermore, the one or more network nodes 111 may perform other downstream intelligent auto-calculations based on receiving the one or more digital payment tokens. Once a cash obligation is fulfilled and the respective digital payment token has been updated, the one or more network nodes may perform another set of intelligent auto-calculations to update the relevant database records and/or initiate associated transactions within the blockchain or a third party system via an API.

Figure 2:
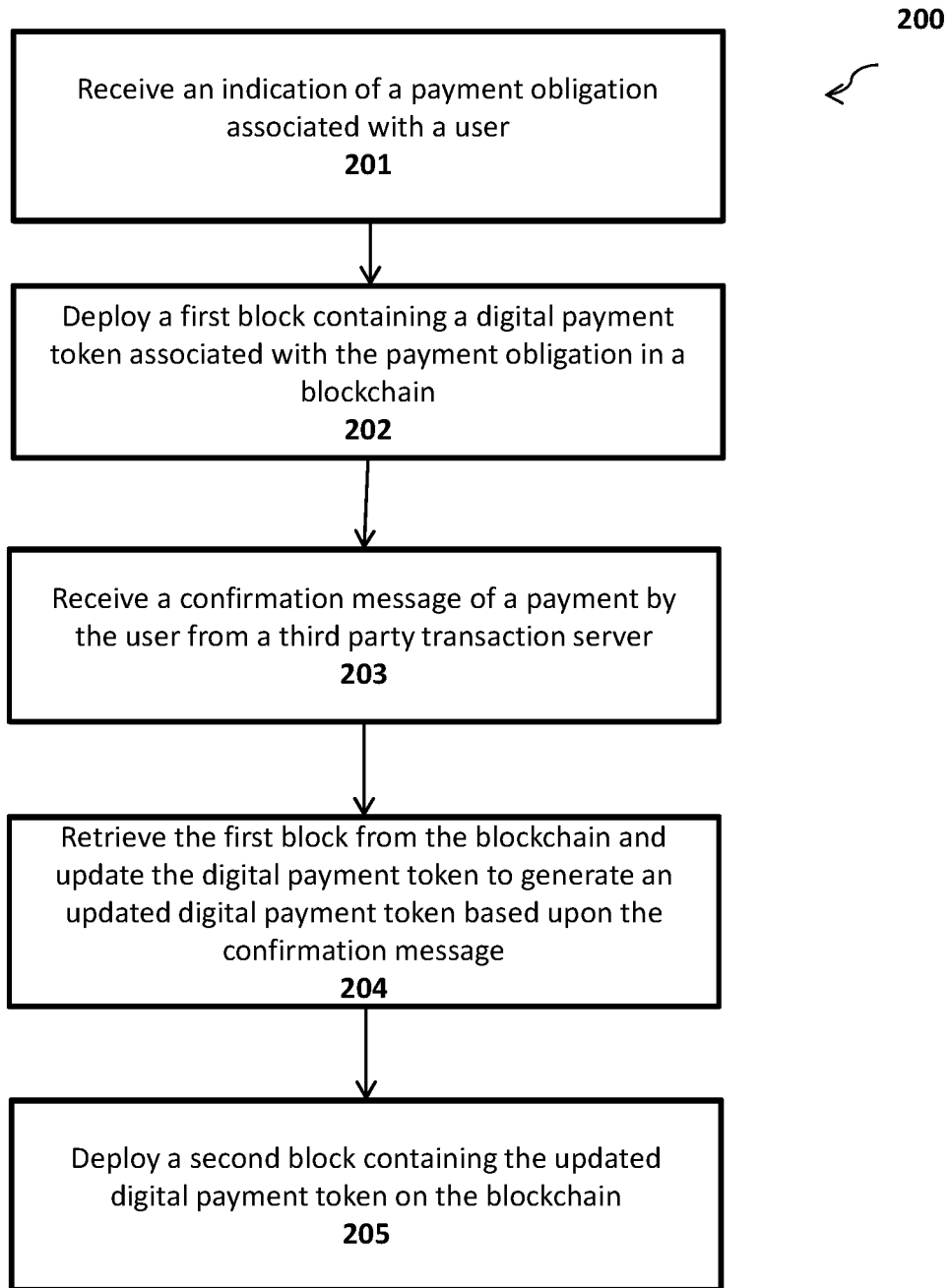
FIG. 2 shows an execution of an exemplary method 200 of generating and updating digital payment tokens, according to an exemplary embodiment.

FIG. 2 shows an exemplary method 200 of generating and updating digital payment tokens, according to an exemplary embodiment. Although one or more computing devices and one or more databases may implement one or more steps of the method 200, the following description details, for brevity, an application server and a database implementing the steps of the method 200. One having skill in the art will appreciate that some embodiments may comprise additional or alternative steps, or may omit several steps altogether.

In a first step 201, the application server may receive an indication of a payment obligation associated with a payor-user. The indication may contain user identifying information identifying the payor-user and payment obligation information associated with the payor-user. In some embodiments, the application server may receive the indication from a user computer or a network node. In other embodiments, the application server may generate the indication based upon the application server executing one or more smart contracts stored on a blockchain. In yet other embodiments, the application server may generate the indication based on an intelligent auto-calculation performed by the application server or any other computing system. The indication may contain a payor-user identifying information such as a user identifying code, the amount of payment obligation, and/or the time frame (e.g. a due date) for the payor-user to fulfill the payment obligation.

In a next step 202, the application server may deploy a first block containing a digital payment token associated with the payment obligation in a blockchain. A digital payment token may indicate a status of the payment obligation. The digital payment token may further indicate the amount of payment obligation. For example, the digital payment token may indicate that the payor-user has a fifty thousand dollar payment obligation and the payor-user hasn't fulfilled their payment obligation. The application server may generate the first block containing the digital payment token associated with the payor-user. In addition to the digital payment token, the application server may include other information such as digital payment tokens associated with other users, one or more smart contracts, and/or one or more documents in the first block. In some implementations, to deploy the first block to a blockchain, the application server may poll the network nodes and determine the latest valid blockchain. The application server may use a predetermined threshold for determining the latest valid blockchain. For example, the application server may query the network nodes for the latest blockchain. If the application server receives the same blockchain from 51% of the network nodes, the application server may determine that the received blockchain is the latest valid blockchain. One ordinarily skilled in the art appreciates that the predetermined threshold is set upon the level of integrity required for the data and instructions stored in the blockchain. The application server may use a higher predetermined threshold for data requiring a higher level of security and integrity, for example, electronic money transfers. After the application server determines the latest valid blockchain, the application server may append the first block to the latest valid blockchain. To do so, the application server may use the hash of contents of the last block of the latest valid blockchain to generate the address of the first block. In addition, the application server may use the hash of the contents of the first block to generate the addressed address of the first block. In some implementations, the application server may use the hash of the contents of the last block, the hash of the contents of the first block, and a nonce value to generate the address of the first block. The application server may then store the address of the first block in the database. Furthermore, the application server may encrypt the data in the first block by using an algorithm such as a hashing algorithm. The application may generate a hash value of the contents of the first block and store the hash value in the first block. For instance, the application server may hash portions of the first block separately to create intermediate hash values and generate a final hash value based on the intermediate hash values and store the final hash value in the first block. Alternatively, the application server may hash the entire content of the first block to generate the final hash value and store the hash value in the first block.

In some implementations, the application server may transmit an instruction to the network nodes to append the first block to the latest valid blockchain as determined by one or more of the network nodes. In these implementations, the application server may receive the address of the first block in the blockchain from one or more network nodes and store the address in the database.

In some implementations, the application server may access the first block from the blockchain and retrieve the digital payment token associated with the payor-user. Based on the digital payment token, the application server may generate an instruction to the payor user's computing device to indicate that the payor-user has a payment obligation. In response to this instruction, the payor-user may initiate a payment using a third-party transaction server. In some implementations, the application server may execute smart contracts stored in one or more blocks of the blockchain and retrieve the digital payment token and generate the instruction based upon the execution of the smart contracts. In some implementations, application server may transmit a message containing the digital payment token to a user device associated with the payor-user. The digital payment token may trigger the user device to generate a graphical user interface (GUI) to render a notification associated with the digital payment token. The notification may allow the payor-user to initiate a payment using a third-party transaction server. In some implementations, the application server may transmit a message to the payee-user and/or a permissioned third-party user indicating that a digital payment token has been generated and a payment should be expected. The message may include a message in any form such as a text message, an email message, or an automated phone call. In addition, the application server may transmit messages to other interested parties based on the permission controls.

In a next step 203, the application server may receive a confirmation message of a payment by the payor-user from the third-party transaction server. The confirmation message may include user identifying information and the amount of payment made from an account associated with the payor-user. For example, the confirmation message may indicate that the payor-user identified by the user identifying information has paid a certain amount to the identified payee-user. In some implementations, the payment amount may be a partial fulfilment of the payment obligation.

In a next step 204, the application server may retrieve the first block from the blockchain and update the digital payment token to generate an updated digital payment token based upon the confirmation message. The application server may query the database using the user identifying information to retrieve data records containing the address of the block where the digital payment token for the payor-user has been previously stored in the blockchain. Continuing with the above example, the data records may contain the address of the first block in the blockchain. The application server may retrieve the latest valid blockchain by polling one or more network nodes. After the application server retrieves the latest valid blockchain, the application server may use the address to query the blockchain and retrieve the data records including the digital payment token in the first block. The application server may then update the retrieved data records based on the confirmation message received from the third party transaction server. For example, if the application server determines that the confirmation message indicates that the payor-user has paid the full amount, the application server may update the digital payment token to indicate a paid status. If the application server determines that the confirmation message indicates that the payor-user has paid a partial amount, the application server may update the amount remaining to be paid in the digital payment token.

In a next step 205, the application server may deploy a second block containing the updated digital payment token on the blockchain. In addition to the updated digital payment token, the application server include other information such as updated digital payment tokens associated with other users, one or more smart contracts, and/or one or more documents in the second block. In some implementations, to deploy the second block to the blockchain, the application server may poll the network nodes and determine the latest valid blockchain. In some implementations, these network nodes may be the same as the network nodes polled in step 202. In other implementations, these network nodes may be different from the network nodes polled in step 202. The application server may use a predetermined threshold for determining the latest valid blockchain. For example, the application server may query the network nodes for the latest blockchain. If the application server receives the same blockchain from 51% of the network nodes, the application server may determine that the received blockchain is the latest valid blockchain. One ordinarily skilled in the art appreciates that the predetermined threshold is set upon the level of integrity required for the data and instructions stored in the blockchain. The application server may use a higher predetermined threshold for data requiring a higher level of security and integrity, for example, electronic money transfers. After the application server determines the latest valid blockchain, the application server may append the second block to the latest valid blockchain. To do so, the application server may use the cryptographic hash (or simply hash) of contents of the last block of the latest valid blockchain to generate the address of the second block. In addition, the application server may use the cryptographic hash of the contents of the second block to generate the address of the second block. In some implementations, the application server may use the cryptographic hash of the contents of the last block, the cryptographic hash of the contents of the second block, and a nonce value to generate the address of the second block. The application server may store the address of the second block in the database. Furthermore, the application server may store an indication in the database that the second block is an updated version of the first block. In other words, the application server may store an indication in the database that the second block supersedes the first block. Furthermore, the application server may encrypt the data in the second block by using an algorithm such as a hashing algorithm. The application may generate a hash value of the contents of the second block and store the hash value in the second block. For instance, the application server may hash portions of the second block separately to create intermediate hash values and generate a final hash value based on the intermediate hash values and store the final hash value in the second block. Alternatively, the application server may hash the entire content of the second block to generate the final hash value and store the hash value in the second block. In some embodiments, in response to the updated digital payment token, the computer system may perform other downstream intelligent auto-calculations such as generating new payment obligations based on the payment amount received and management fees that have come due.

In some implementations, the updates to the digital token may indicate that the payment obligation has been fulfilled and therefore the digital payment token has expired. That is, the application server may update one or more pieces of information to indicate that the digital payment token is expired. In some implementations, the application server may perform multiple updates to the generated digital payment tokens based on indication of one or more payment amounts received from the third party transaction server. For example, the application server may receive a first message from the third party transaction server that a payment obligation associated with a digital payment token has been partially satisfied, i.e. a first portion of the payment obligation has been fulfilled. The application server may update the digital payment token, generate a blockchain block containing the updated digital payment token and append the blockchain to the latest valid blockchain. The application server may then receive a second message from the third party transaction server that a second portion of the payment application has been fulfilled. In response to the second message, the application server may retrieve the updated digital payment token, make a second update to the digital payment token and upload the digital payment token with the second update to the blockchain using the steps detailed above.

FIG. 3 shows execution of an exemplary method 300 for generating and monitoring a digital payment token in response to a user-initiated transaction, according to an exemplary embodiment. The exemplary method 300 comprises steps 301, 303, 305, 307, and 309 but one having skill in the art would appreciate that other embodiments may comprise additional or alternative steps, or may omit some steps altogether. Although one or more computing devices and one or more databases may implement one or more steps of the method 300, the following description details, for brevity, an application server and a database implementing the steps of the method 300.

In a first step 301, a payee-user or a permissioned third-party user initiates a payment transaction associated with a contractual payment obligation that may be captured within a smart contract. For example, a payee-user or a permissioned third-party user may interact with a graphical user interface (GUI) of a website hosted on a webserver, to input a payment request that a payor provide a payment. In some cases, the payment request may be associated with a pre-existing contractual agreement or smart contract on the blockchain. An exemplary smart contract may be an initiate payment obligation smart contract. Alternatively, a smart contract may be automatically generated by the webserver or an application server based upon the payment request inputs received from the payee-user or the permissioned third-party user client device, via the webserver. In some embodiments, the smart contract associated with the payment request may automatically be generated in response to a document upload to the blockchain. In either case, the payment request may be associated with one or more clauses (i.e., portions of executable code) of the smart contract. In some implementations, the payment request may be generated as a response to receiving one or more digital event triggers. In other implementations, one or more oracles may trigger the smart contracts to generate the payment transactions.

In some implementations, the application server may generate a notification message to be transmitted to client device of a payor-user, indicating that the webserver or application server received the payment request from a payee-user, via the website. The notification may be in any number of data formats and may be transmitted to any number of devices through the associated networks and channels. Non-limited examples of client devices of the payor-user may include desktop computer, laptop computers, tablet computers, cellular telephones (e.g., smart-phones), and the like. Likewise, the corresponding notification transmission channels may include any number of IP-based computer networks and/or telecommunications networks. Non-limiting examples of data formats of the notification message may include application-specific notifications, e-mails, and text-messages (e.g., SMS, MMS), among others. The notification message may indicate data payment information (e.g., amount, payment deadline, payee identifiers, payment clause information) and/or indicate that a digital payment token was generated on the instances of the system blockchain. In some implementations, the notification message may trigger the client device to generate a graphical user interface (GUI) to indicate the payment request. The GUI may further provide one or more graphical tools for the payor-user to input payment information. In some implementations, the application server may generate a notification message to be transmitted to a client device of the payee-user, wherein the message indicates that a payment should be expected.

In a next step 303, the application server instructs a third-party server of a payment services system (e.g., Fedwire, ACH, SWIFT) to execute a payment from a payor-account to a payee-account, using the payment data provided from the payment request inputs or the smart contract. In some cases, a web application executed by the webserver may provide instructions and data inputs to a payment services application executed by the application server, triggering the application server to initiate the payment transfer between accounts. In response, the application server transmits instructions, account data, and other payment data to the third-party server of the payment services system. The application server may then monitor the payment records published by the third-party server In some embodiments, the payment instructions may be automated in that the application server may retrieve the address of a payment entity or a bank based on a payment entity relationship table and automatically transmit instructions to the servers of the payment entity or the bank. In some implementations, the payment entity relationship table may be stored in local database, and the application server may query the local database using the payor and/or the payee identification to retrieve database records to identify the payment entity of the payor and/or the payee. In other implementations, the payment entity relationship table may be external to the application server and the application server may make API calls to identify the payment entity of the payor and/or the payee. In these implementations, an adapter may provide a connection to the external payment entity relationship table to the application server. In yet other implementations, the payment entity relationship table may be implemented as a part of a smart contract in the system blockchain and the application server may retrieve the smart contract from the latest valid blockchain. Based on execution of the smart contract, the application server may identify the payment entity of the payor and/or the payee and automatically transmit instructions to the servers of the payment entity to effectuate the payment. In some embodiments, the payment system may receive manual instructions from the payor-user, payee-user, and/or a permissioned user to effectuate the payment. Although the aforementioned embodiments describe a payment system as a third party system, the embodiments wherein the payment system may be a blockchain enabled separate system maintained by distributed network nodes hosting the blockchain should be considered within the scope of this disclosure.

In a next step 305 when the application server receives a notification from the third-party server indicating a successful payment submission, the application server may generate a new token block for a new digital payment token to be added to the system blockchain, where the new digital payment token may comprise transaction data pulled from a payment transaction record generated by the application server in a system database and/or transaction data associated with a clause of the smart contract in a block on the blockchain. The payment transaction data of the digital payment token may include data fields including the payee, the payor, and an amount of the transaction, among other fields of transaction data. The application server may generate a block address for the new token block by generating a hash value from one or more data fields of the digital payment token of the new token block and one or more data fields of one or more preceding blocks of the system blockchain. The application server may then store the block address into the payment record within the system database, and/or store the block address into a smart contract on the system blockchain. The application server may then transmit the updated system blockchain to each of the network nodes, which, in turn, update the local blockchain instances locally stored on each of the network nodes. Alternatively, the application server may transmit the token block to each of the other network nodes and each of the other network nodes may update the respective local blockchains to add the token block. In some embodiments, the application server may record in the blockchain additional blockchain transactions associated with the purpose of the payment. For example, the received payment may be associated with a capital call and when the application receives the notification of the payment submission, the application server may generate another block with updates to a capital call record. For example, the capital call record may indicate the amount of capital requested; and once the portion of the payee-user has been submitted for payment, the application server may update the capital call record in the blockchain to reflect the receipt of the payment submission notification.

In a next step 307, the application server may receive a status response from the third-party server of the payment service indicating that the payment was settled (i.e., the funds were transferred between accounts). In some embodiments, the application server may receive the status response from a payment service system implemented as a separate system by distributed network nodes hosting the blockchain. In some implementations, the application server or the webserver may generate a payment completion message and transmit the payment completion message to the one or more client devices of the payor-user, the payee-user, and/or a permissioned third party user.

In a next step 309, the application server may generate a second new token block, superseding the first new token block, and containing a second digital payment token indicating that the payment was completed. The second digital payment token may comprise transaction data that may be pulled from the transaction data contained within the status response received from the third-party server, and/or the transaction data may be pulled from the payment transaction record updated by the application server based on the status response received from the third-party service. The application server may generate a block address for the second token block by generating a hash value from one or more data fields of the second digital payment token of the second token block and one or more data fields of one or more preceding blocks of the system blockchain. The application server may then store the block address of the second token block into the payment record within the system database, and/or store the block address of the second payment block into a smart contract on the system blockchain. In this way, the data of the second digital payment token supersedes the data of the first digital payment token, even though the data of the first token block remains on the system blockchain. In some embodiment, the second digital payment token indicates that the first digital payment token has expired. The application server may then transmit the updated system blockchain to each of the network nodes, which, in turn, update the local blockchain instances locally stored on each of the network nodes. Alternatively, the application server may transmit the second token block to each of the other network nodes and each of the other network nodes may update the respective local blockchains to add the token block. In some embodiments, the generation of the new token block may be a digital event trigger for one or more intelligent auto-calculations. In some embodiments, the application server may record in the blockchain additional blockchain transactions associated with the purpose of the payment. For example, the received payment may be associated with a capital call and when the application receives the notification of the payment settlement, the application server may generate another block with updates to a capital call record. That is, the application server may retrieve from and update the capital call record in the blockchain to reflect the payment settlement. In other words, the application server may update the capital call record within the blockchain (i.e. by generating a superseding block for an existing block) to reflect that the payee-user's portion of the capital called has been received.

Figure 4:
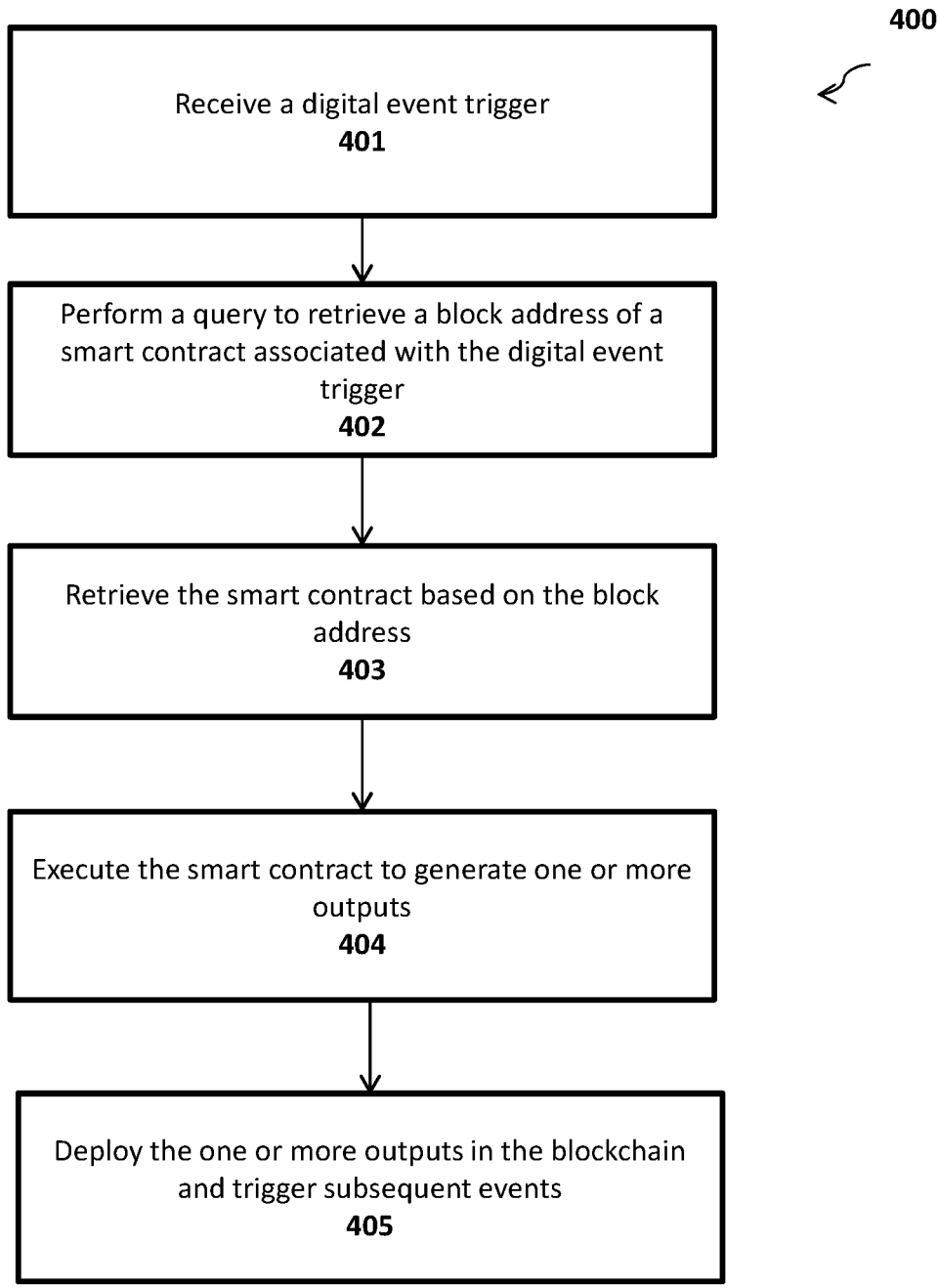
FIG. 4 shows an exemplary method 400 for intelligent auto-calculation, based on the one or more smart contract blocks deployed in a blockchain, according to an exemplary embodiment.

FIG. 4 shows an exemplary method 400 for intelligent auto-calculation, based on the one or more smart contracts deployed in a blockchain, according to an exemplary embodiment. Although multiple network nodes may implement various steps of the method 400, the description below includes a network node implementing the various steps for brevity. The network node may contain one or more computing systems such as servers and/or client devices and one or more databases. Furthermore, one having ordinary skill in the art understands that additional steps may be added to the method 400, one or more steps may be substituted, and/or one or more steps may be skipped altogether.

In a first step 401, the network node may receive a digital event trigger. The digital event trigger, for example, may have been generated by a standalone application or a browser based application running on the network node. In addition or in the alternative, the digital event trigger may have been generated by other network nodes in communication with the network node. In some implementations, the digital event trigger may have been generated internally within a program being executed by the network node. That is, a first program module may generate the digital event trigger in response to detecting one or more conditions and transmit the digital event trigger to a second software module. The one or more conditions may be encoded in the software modules generating the digital event triggers. In some implementations, the digital event trigger may be a digital payment token and updates thereto. In some implementations, the digital event trigger may be generated by an API-driven event.

As mentioned above, the one or more conditions that may cause a digital event trigger may be encoded in one or more software modules. In some implementations, the software modules may be a part of a software system that runs on multiple network nodes. Alternatively, the one or more software modules may be a part of a software system that runs on a single network node. Regardless, the encoded conditions may include, for example, a date, elapsed time, a counter reaching a certain numerical value, a user action, and other types of conditions. In some implementations, a respective software module may generate a digital event trigger when the software module determines that a system date received from an operating system or any other program in the computer matches the stored date. In some implementations, a software module may implement a timer function; and when the timer expires, the software module may generate a digital event trigger. In some implementations, the software module may implement a counter function, and generate a digital event trigger when the software module determines that the counter function has reached a certain numerical value. In these examples, the trigger points for the date, the elapsed time, the numerical value of the counter may be determined by other software modules based upon some processing one or more data records or a current state of a state machine. Alternatively, these trigger points may be manually coded into the respective software modules. In some implementations, a software module may generate a digital event trigger in response to receiving one or more inputs from a user interface associated with the network node and/or other network nodes. For example, a system user may input information the user interface or execute a code that passes pieces of information to the user interface API, and the software module implementing the user interface may transmit the received information the software module generating the digital even trigger. For example, a system user may input a request for a capital call from the user interface, and the software module implementing the user interface may transmit the received information to the trigger software module.

In some implementations, the digital event trigger may be implemented as a part of a smart code or smart contract. For example, the aforementioned software modules detecting one or more digital event triggers may be a part of a smart contract. These software modules may be the portion of the smart contract running locally on the network node and may invoke other portions of the smart contract stored in the blockchain as detailed below. In some implementations, one or more digital event triggers may be from one or more oracle sources.

In a next step 402, the network node may perform a query to retrieve a block address of a smart contract (or a smart code) associated with the digital event trigger. The query may be any kind of a database query such as a structured query language (SQL) query to a database. In some implementations, the queried database may be stored locally within one or more non-transitory storages within the network node. In other implementations, the database may be stored and/or shared across multiple network nodes. The database may include, for example, data records with reference to one or more block addresses for a smart code associated with the digital event trigger. In some embodiments the network node may perform a blockchain query. One or more data blocks within the blockchain may include block addresses of the smart code associated with the digital event trigger. A blockchain query is detailed in description of step 403 below. One having ordinary skill in the art understands that the network node may download and validate a single blockchain for each of the steps 403, 404, and 405. Alternatively, the network node may perform separate blockchain downloads and validations for one or more of the steps 403, 404, and 405. Furthermore, the network node may not necessarily download and validate the entire blockchain, but may download just a portion thereof depending upon database query the network node may have to perform. The query may not have to be a single query but may contain multiple queries to multiple databases wherein each successive query may depend upon one or more preceding query. Once the network node retrieves the block address based upon one or more queries, the network node may execute next step 403.

In the next step 403, the network node may retrieve the smart contract (or smart code) based on the block-address. For retrieving the smart code, the network node may have to have a copy of the latest valid blockchain. To get a copy of the latest valid blockchain, the network node may transmit a request to other network nodes to transmit back the respective blockchains hosted by the other network nodes. The network node may compare the blockchains received from the other network nodes with each other and to the copy of the blockchain hosted by the blockchain node. In some implementations, such comparison includes the network node comparing the series of the cryptographic hashes indicating the block addresses of multiple blocks in the blockchain. In other implementations, the network node may compare one or more data records within the data blocks in addition to or as an alternative to comparing the series of cryptographic hashes. Regardless of the comparison protocol, the network mode may implement a consensus algorithm to ascertain the latest valid blockchain. The consensus algorithm may have different consensus thresholds based upon the criticality of the data records in the blockchain. For a more critical data, the network node may validate the latest blockchain if there is a more than fifty percent hit. That is, fifty percent of the received/stored blockchains match with one another, the network node may designate the blockchain to be a valid blockchain. In more critical systems, the threshold may be higher, such as ninety percent.

Once the network node has determined the latest valid blockchain, the network node may query the blockchain using the block address to retrieve the smart code. In some implementations, portions of smart code may have been stored in multiple blocks and the network node may have to do multiple queries using the multiple block addresses. In other implementations, the smart code may be in a single block of the blockchain and a single query would suffice. Once the smart code is retrieved, the network node may execute step 404.

In the next step 404, the network node may execute the smart code or smart contract to generate one or more outputs. For example, the smart code may perform an auto-calculation based implementation of a fund management fee scheme in a private equity context. For example, a fund manager may charge a hundred thousand dollars over a period of one year paid at quarterly intervals. The digital event trigger may be the current date reaching the predefined quarter-end date. Based on this digital event trigger generated by another software or a module within the smart contract itself, the smart contract may update a first data record associated with the fund to debit the quarterly payment and a second data record associated with the fund manager to credit the corresponding quarterly payment. In other words, some of the outputs of executing the smart contract may be a data record in a payment database for example, indicating a debit to the first data record and credit to the second data record. In some embodiments, a third party transaction server may execute the quarterly payments. The network node may transmit an indication to the third party transaction server that a payment should be effectuated; and the third party transaction server may transmit one or more transaction requests to a banking server hosting an account associated with the private equity. The banking server may then transmit the payment to a second banking server hosting an account associated with the fund manager. In other embodiments, the distributed network nodes may maintain a separate payment system. That is, even though payment records are stored in the blockchain, the separate payment system associated with the distributed network nodes may process the aforementioned payments. The separate payment system may debit an account associated with the private equity and credit an account associated with the fund manager to effectuate a payment.

As another example, a digital event trigger may be associated with a late payment in a private equity context. After a predetermined payment due date is passed, the network node and/or other network nodes may generate a digital event trigger to retrieve a smart contract associated with the late payment implementing the aforementioned steps 401, 402, and 403. Upon execution of the smart contract, the smart contract may automatically calculate the late payment fees based on the one or more execution steps coded in the smart contract. For instance, the late payment fee may be a percentage of the amount due at the due date. In another instance, the late payment fee may be an amount pro-rated based on the number of days elapsed since the passage of the due date. One having ordinary skill in the art understands that these intelligent auto-calculations are merely exemplary, and other types and forms of auto-calculations should be considered to be within the scope of this disclosure.

In a next step 405, the network node may deploy the one or more outputs to the blockchain and trigger subsequent events. In some implementations, the network node may download a new latest valid blockchain based upon one or more consensus algorithm prior to deploying the one or more outputs to the blockchain. In other implementations, the network node may use the blockchain validated in the previous steps to deploy the one or more outputs to the blockchain. Continuing with the above example of management fees, some of the outputs may be the respective updates to the first and second data records and another corresponding update to the payment database. To deploy these outputs to the blockchain, the network node may retrieve a portion of the last block in the blockchain. For example, a hash value within the last block of the blockchain may indicate the block address or a portion thereof the next block to be appended to the blockchain. Accordingly, the network node may retrieve this hash value and may use this hash value as the address of the new block to be appended to the blockchain. Alternatively, the network node may generate a cryptographic hash of the hash value with a portion of data records in the new block to be deployed in the blockchain. The network node may also generate a cryptographic hash of at least a portion of the data records within the new block to generate hash value for the new block, wherein the hash value may be used as or used to generate the block address of a subsequent block in the blockchain. One having ordinary skill in the art understands that the aforementioned block linking mechanism is merely exemplary and other block linking mechanisms should be considered to be within the scope of this disclosure.

In some embodiments, the network node may trigger one or more subsequent events based on the one or more outputs. For example, the network node may transmit a notification to a user interface associated with a fund participant that a fund management payment has been made to a fund manager. In another example, the network node may transmit a notification to the user interface associated with the fund participant with a token about payment obligation. In some instances, the network node may trigger more smart contract executed events or transactions such as creation of cash obligation tokens. In other instances, the network node may trigger API driven events.

The aforementioned embodiments may solve the technical shortcomings in the conventional blockchain technology. The novel and non-conventional functionality disclosed herein automatically, securely, and intelligently may generate, track, and update digital payment tokens between multiple transacting parties. The exemplary systems and methods may interact with a third party payment server or implement a separate payment system to receive payment confirmation and update an associated digital payment token and trigger other downstream transactions. In addition, the exemplary systems and methods may integrate one or more smart contracts with one or more digital payment tokens to achieve the aforementioned functionality.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims. Furthermore, qualifiers "a" and "an" before a logical block, a module, a circuit, and an algorithm are not intended to be limiting, and multiple such components should be considered to be within the scope of this disclosure.

Embodiments implemented in computer software may be implemented in software, firmware, middleware, microcode, hardware description languages, or any combination thereof.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:

receiving, by a network node of a private blockchain, from a client device of a payee-user, a payment request containing a set of payment data for a payment transaction;

in response to the network node receiving the payment request from the client device of the payee-user;

generating, by the network node, a first digital payment token comprising a plurality of data fields of the set of payment data comprising an amount of payment, a currency for payment, a set of identifying information of the payee-user, a set of identifying information of a payor-user, a payment period, and a payment status field of the payment transaction, wherein the payment status field indicating an incomplete payment status when the network node generates the first digital payment token;

transmitting, by the network node, a first message to a client device of the payor-user informing of the incomplete payment status and comprising the data fields of the set of payment data received from the client device of the payee-user;

generating, by the network node, a first token block containing the first digital payment token on the private blockchain, wherein the network node generates a first address for the first token block based upon a cryptographic hash of a data record of a block of the private blockchain;

executing, by the network node, after the first message has been transmitted by the network node to the client device of the payor-user, an executable script associated with the first address of the first token block in the private blockchain;

transmitting, by the network node, to a third-party server of a payment service system a transaction request in response to receiving an authorization from the payor-user to the first message and requesting the third-party server to transfer funds from a payor account to a payee account according to the payment request containing the set of payment data for the payment transaction;

receiving, by the network node, from the third-party server, a status message indicating that the funds are transferred from the payor account to the payee account according to the payment request containing the set of payment data for the payment transaction and the payment transaction is complete;

in response to the network node receiving, from the third-party server, the status message indicating that the payment transaction is complete;

generating, by the network node, a second digital payment token comprising:
(1) the data fields of the set of payment data,
(2) the payment status field that is updated by the network node indicating that the payment transaction is complete, and
(3) an indication that the first digital payment token has expired;

associating, by the network node, the second digital payment token with the first digital payment token that is indicated as expired;

generating, by the network node, a second token block superseding the first token block and containing the second digital payment token on the private blockchain, wherein the network node generates a second address different from the first address for the second token block based upon a cryptographic hash of a data record of a block of the private blockchain; and transmitting, by the network node, a second message to the client device of the payor-user, the second message comprising the status message received from the third-party server of the payment service system indicating the payment transaction being complete.

2. The method of claim 1, wherein transmitting the transaction request to the third-party server further comprises:

transmitting, by the network node, an authorization request to the client device of the payor-user; and receiving, by the network node, a first set of credentials from the client device of the payor-user, wherein the first set of credentials authenticates the payor-user; and wherein the network node transmits the transaction request to the third-party server upon determining that the first set of credentials match a second set of credentials stored in a system database.

3. The method of claim 1, wherein transmitting the transaction request to the third-party server further comprises:

executing, by the network node, another executable script in the private blockchain and generating an automated request instructing the network node to transmit the transaction request to the third-party server, wherein the automated request authorizes the network node to transmit the transaction request.

4. The method of claim 1, wherein the first message triggers a notification of a graphical user interface on the client device of the payor-user.

5. The method of claim 1, further comprising:

validating, by the network node, the payment request based upon the network node executing an executable script implementing a permission control.

6. The method of claim 1, wherein the network node generates the first digital payment token in response to an output of an intelligent auto calculation.

7. The method of claim 1, further comprising:

in response to the network node receiving the status message from the third-party server, that the payment transaction is complete;

retrieving, by the network node, a transaction record from a transaction record block in the private blockchain, wherein the transaction record is associated with the generation of the first token block;

generating, by the network node, a second transaction record block based on updating the transaction record reflecting the transfer of funds;

appending, by the network node, the second transaction record block to the private blockchain; and triggering, by the network node, a subsequent blockchain based transactions or processes based upon the update to the transaction record.

8. The method of claim 1, further comprising:

retrieving, by the network node, an address of the third-party server based on the network node querying a payment entity relationship table.

9. A system comprising:

a plurality of network nodes of a private blockchain, wherein each of the network nodes including a non-transitory storage medium storing a respective local copy of the private blockchain;

at least one network node of the plurality of network nodes having a processor and a non-transitory storage medium storing a set of computer readable instructions that when executed by the processor cause the processor to perform:

receiving a payment request containing a set of payment data for a payment transaction from a client device of a payee-user;

in response to receiving the payment request from the client device of the payee-user:

generating a first digital payment token comprising a plurality of data fields of the set of payment data comprising an amount of payment, a currency for payment, a set of identifying information of the payee-user, a set of identifying information of a payor-user, a payment period, and an incomplete payment status field of the payment transaction, wherein the payment status field indicating an incomplete payment status when the at least one network node generates the first digital payment token;

transmitting a first message to a client device of the payor-user informing of the incomplete payment status and comprising the data fields of the payment data received from the client device of the payee-user;

generating a first token block containing the first digital payment token on the private blockchain, wherein the processor generates a first address for the first token block based upon a cryptographic hash of a data record of a block of the private blockchain;

executing, after the first message has been transmitted to the client device of the payor-user, an executable script associated with the first address of the first token block in the private blockchain;

transmitting to a third-party server of a payment service a transaction request in response to receiving an authorization from the payor-user to the first message and requesting the third-party server to transfer funds from a payor account to a payee account according to the payment request containing the set of payment data for the payment transaction;

receiving, from the third-party server, a status message indicating that the funds are transferred from the payor account to the payee account according to the payment request containing the set of payment data for the payment transaction and the payment transaction is complete;

in response to receiving, from the third-party server, the status message indicating that the payment transaction is complete:

generating a second digital payment token comprising:
  (1) the data fields of the set of payment data,
  (2) the payment status field that is updated by the network node indicating that the payment transaction is complete, and
  (3) an indication that the first digital payment token has expired;

associating the second digital payment token with the first digital payment token that is indicated as expired;

generating a second token block superseding the first token block and containing the second digital payment token on the private blockchain, wherein the network node generates a second address different from the first address for the second token block based upon a cryptographic hash of a data record of a block of the private blockchain; and transmitting a second message to the client device of the payor-user, wherein the second message comprising the status message received from the third-party server of the payment service system and indicating the payment transaction being complete.

10. The system of claim 9, wherein the set of computer readable instructions when executed by the processor cause the processor to further perform:
   transmitting an authorization request to the client device of the payor-user; and
   receiving a first set of credentials from the client device of the payor-user, wherein the first set of credentials authenticates the payor-user; and
   transmitting the transaction request to the third-party server upon the processor determining that the first set of credentials match a second set of credentials in a system database.

11. The system of claim 9, wherein the set of computer readable instructions when executed by the processor cause the processor to further perform:
   executing another executable script in the private blockchain and generating an automated request instructing the processor to transmit the transaction request to the third-party server, wherein the automated request authorizes the processor to transmit the transaction request.

12. The system of claim 9, wherein the first message triggers a notification of a graphical user interface on the client device of the payor-user.

13. The system of claim 9, further comprising: an executable script implementing a permission control, and wherein the set of computer readable instructions when executed by the processor cause the processor to further perform:
   validating the payment request based upon executing the executable script implementing the permission control.

14. The system of claim 9, further comprising an output of an intelligent auto-calculation, and wherein the set of computer readable instructions when executed by the processor cause the processor to further perform:
   generating the first digital payment token in response to the output of the intelligent auto-calculation.

15. The system of claim 9, wherein the set of computer readable instructions when executed by the processor cause the processor to further perform:
   in response to receiving the status message, from the third-party server, that the payment transaction is complete:
   retrieving a transaction record from a transaction record block in the private blockchain, wherein the transaction record is associated with the generation of the first token block;
   generating a second transaction record block based on updating the transaction record reflecting the transfer of funds;
   appending the second transaction record block to the private blockchain; and
   triggering a subsequent blockchain based transactions or processes based upon the update to the transaction record.

16. The system of claim 9, wherein the set of computer readable instructions when executed by the processor cause the processor to further perform:
   retrieving an address of the third-party server based on a query to a payment entity relationship table.

* * * * *